United States Patent [19]

Relf

[11] Patent Number: 5,659,590

[45] Date of Patent: Aug. 19, 1997

[54] REMOVABLE SHROUD AND PUMP DECK FOR A BOILING WATER NUCLEAR REACTOR

[75] Inventor: Charles William Relf, Fremont, Calif.

[73] Assignee: General Electric Company, Schenectady, N.Y.

[21] Appl. No.: 635,555

[22] Filed: Apr. 22, 1996

Related U.S. Application Data

[62] Division of Ser. No. 354,736, Dec. 6, 1994, Pat. No. 5,519,744.

[51] Int. Cl.⁶ .................................................. G21C 15/00
[52] U.S. Cl. ........................... 376/287; 376/302; 376/370; 376/372
[58] Field of Search .................................. 376/285, 287, 376/302, 370, 372, 461

[56] References Cited

U.S. PATENT DOCUMENTS

| | | | |
|---|---|---|---|
| 3,627,634 | 12/1971 | Guenther | 376/303 |
| 3,785,924 | 1/1974 | Notari | 376/302 |
| 3,850,795 | 11/1974 | Thome | 376/463 |
| 4,299,658 | 11/1981 | Meuschke et al. | 376/260 |
| 4,315,800 | 2/1982 | Yoshimoto et al. | 376/402 |
| 4,409,179 | 10/1983 | Burger | 376/302 |
| 4,842,806 | 6/1989 | Ohtomi | 376/247 |
| 5,073,335 | 12/1991 | Townsend | 376/373 |
| 5,075,073 | 12/1991 | Dillmann | 376/461 |
| 5,082,620 | 1/1992 | Fennern | 376/373 |
| 5,118,461 | 6/1992 | Fuji | 376/246 |
| 5,120,493 | 6/1992 | Marquino et al. | 376/373 |
| 5,135,711 | 8/1992 | Borchardt et al. | 376/372 |
| 5,265,141 | 11/1993 | Kobsa | 376/463 |
| 5,303,275 | 4/1994 | Kobsa | 376/352 |
| 5,392,322 | 2/1995 | Whitling et al. | 376/302 |
| 5,426,675 | 6/1995 | Kumar et al. | 376/370 |

FOREIGN PATENT DOCUMENTS

| | | |
|---|---|---|
| 2051780 | 4/1971 | France . |
| 2549423 | 3/1977 | Germany . |
| 2812075 | 9/1979 | Germany . |

OTHER PUBLICATIONS

"Recommendations On Inservice of BWR Internal Components and Attachments" presented to the ASME Section XI Subcommittee on Nuclear Inservice Inspection by the BWR Owner's Group; Apr. 1991.

Primary Examiner—Daniel D. Wasil
Attorney, Agent, or Firm—Nixon & Vanderhye

[57] ABSTRACT

In a pressure vessel of a nuclear reactor containing a core assembly enclosed within a core shroud, the core shroud spaced radially inwardly of a side wall of the pressure vessel with an annular pump deck located in an annular radial space between the core shroud and the side wall of the pressure vessel, the improvement wherein the shroud is removably secured to an annular support leg extending upwardly from the bottom of the pressure vessel; and further wherein the annular pump deck is provided in the form of a plurality of removable segments.

3 Claims, 9 Drawing Sheets

REMOVABLE SHROUD AND PUMP DECK FOR A BOILING WATER NUCLEAR REACTOR

This is a divisional of application Ser. No. 08/354,736, filed Dec. 6, 1994, now U.S. Pat. No. 5,519,744.

TECHNICAL FIELD

This invention relates to boiling water nuclear reactors and specifically, to a dew core shroud and pump deck design which allows for easy removal and/or replacement of these reactor structural components when damaged or otherwise in need of repair or replacement.

BACKGROUND

Typical boiling water nuclear reactors include a reactor assembly which consists of the reactor vessel and its internal components including the core, core shroud, top guide assembly, core plate assembly, steam separator and dryer assemblies, and jet pumps. Also included in the reactor assembly are the control rods, control rod drive housings and the control rod drives.

The reactor vessel is a generally cylindrical pressure vessel (RPV) with a single full diameter removable head. The shroud is a cylindrical stainless steel structure located within the RPV and which surrounds the core, providing a barrier to separate the upward flow through the core from the downward flow in the annulus between the RPV wall and the core shroud. The conventional core shroud is welded to the bottom of the RPV and supports the weight of the top guide, core plate and shroud head along with attached steam separators.

Recent discoveries of unexpected circumferential cracks propagating through the thickness of the shrouds in relatively young operating BWR's has prompted a re-design of the core shrouds for future BWR's.

The primary cause of the observed cracking has been intergranular stress corrosion in the heat affected zones near many of the horizontal welds of the shroud and shroud supports. There have also been some cracks observed in the mid-belt regions of BWR shrouds, and these have been thought to be caused by irradiation assisted stress corrosion.

The current advanced boiling water reactor (ABWR) shroud, like the conventional BWR shroud, is permanently welded to the bottom of the vessel and is not intended to be removed or replaced. The shroud in the ABWR has various horizontal welds similar to the BWR shrouds in current operating plants, and therefore may also be at risk of similar stress corrosion cracking problems.

The conventional pump deck section is permanently welded in place between the shroud and the reactor pressure vessel, and it too is not intended to be removed or replaced. As with the shroud welds, the pump deck welds are also susceptible to stress corrosion cracking.

SUMMARY OF THE INVENTION

This invention relates to a new and improved shroud and pump deck design which allows for the relatively easy removal of both components. In accordance with the invention, both the shroud and pump deck are bolted to the top of the shroud support leg extending upwardly from the bottom of the RPV. Specifically, the shroud has a radially inwardly extending flange at its bottom end for bolting into the upper cylindrical section of the shroud support leg. The bolts restrain vertical loading on the shroud while horizontal loading is restrained by wedges mounted between the shroud and a plurality of wedge support blocks on the pump deck. Thus, the inner diameter portion of the pump deck is vertically sandwiched between the shroud flange and the upper edge of the cylindrical section of the shroud support leg. At the same time, the outer diameter of the pump deck is held in place within a radially inwardly facing groove on the inside wall of the reactor pressure vessel. The pump deck is formed in ten separate segments with a reactor internal pump diffuser adapted to extend vertically through an opening in the middle of each segment.

In a further feature of the invention, a keyed pump deck segment locks the remaining nine deck segments of the pump deck in place. It is the last portion of the pump deck to be installed and the first portion of the pump deck to be removed. This keyed segment is very similar in construction to the other nine segments; however, it is bolted into a support ledge on the reactor pressure vessel wall as opposed simply to being held by the groove on the reactor pressure vessel wall as in the case of the other nine pump deck segments.

From the above, it will be appreciated that after the shroud bolts have been removed, the shroud may be lifted vertically from the core. The keyed pump deck segment can then be removed, followed by the remaining pump deck segments.

Thus, in accordance with one aspect of the subject invention, there is provided in a pressure vessel of a nuclear reactor containing a core assembly enclosed within a core shroud, the core shroud spaced radially inwardly of a side wall of the pressure vessel with an annular pump deck located between the core shroud and the side wall of the pressure vessel, the improvement wherein the shroud is removably secured to an annular support of the pressure vessel.

In accordance with another aspect, the subject invention relates to a pressure vessel of a nuclear reactor containing a core assembly enclosed within a core shroud, the core shroud spaced radially inwardly of a side wall of the pressure vessel with an annular pump deck located between the core shroud and the side wall of the pressure vessel, the improvement wherein the annular pump deck is provided in the form of a plurality of removable segments.

In accordance with still another aspect, the invention relates to a pressure vessel of a nuclear reactor containing a core assembly enclosed within a core shroud, the core shroud spaced radially inwardly of a side wall of the pressure vessel with an annular pump deck located in an annular radial space between the core shroud and the side wall of the pressure vessel, the improvement wherein the shroud is removably secured to an annular support leg extending upwardly from the bottom of the pressure vessel; and further wherein the annular pump deck is provided in the form of a plurality of removable segments.

It will thus be appreciated that the invention provides a shroud and a pump deck capable of being easily removed and reused or replaced. The invention also provides a wedge mechanism to transfer the horizontal loads of a core shroud to the pump deck or other supporting member. The construction in accordance with this invention also results in most horizontal welds being located in otherwise removable elements, facilitating repair and/or replacement of faulty welds.

Other objects and advantages of the subject invention will become apparent from the detailed description which follows.

BEST MODE FOR CARRYING OUT THE INVENTION

Figure 1:
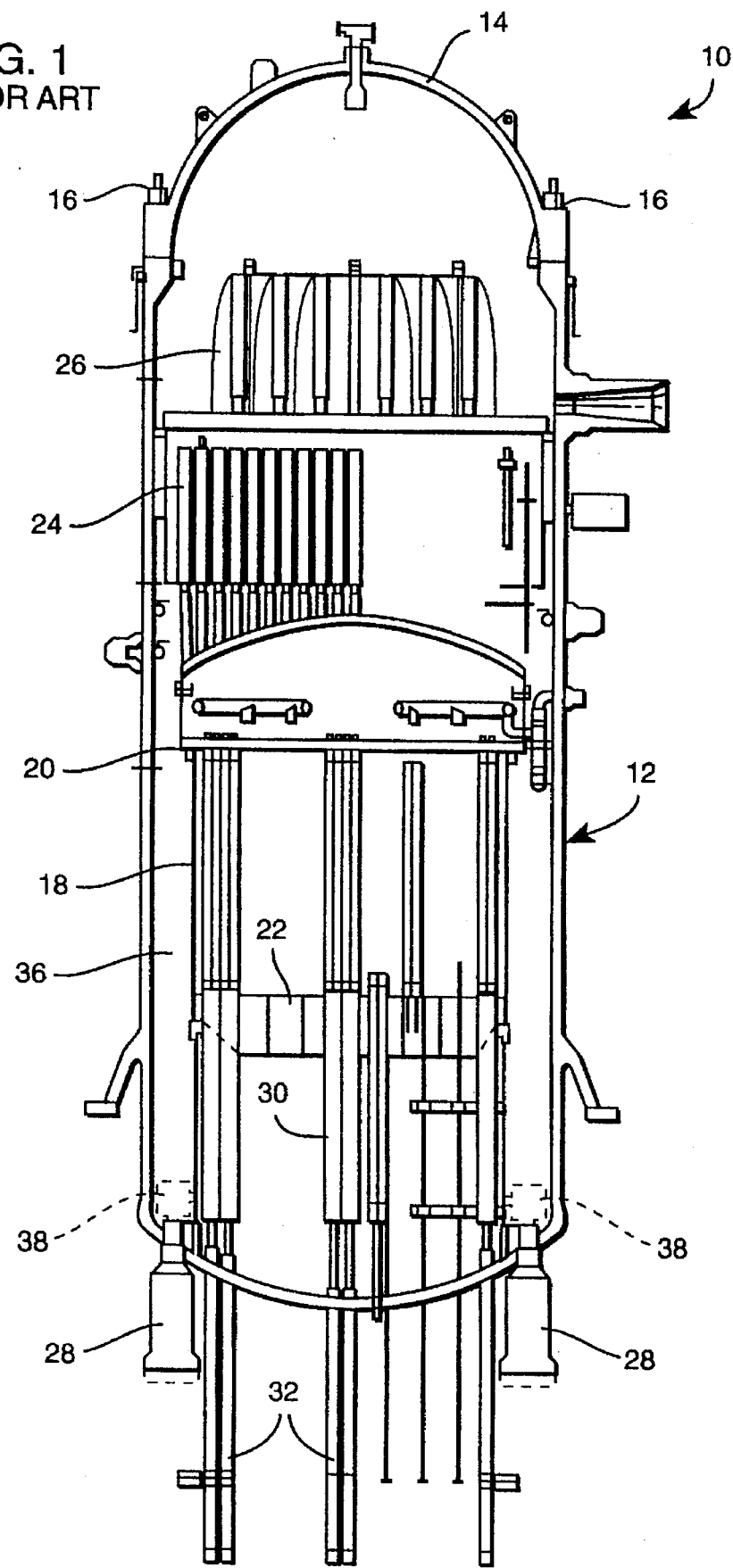
FIG. 1 is a side elevation, partly in section, illustrating a conventional boiling water reactor including a welded-in type core shroud.

With reference to FIG. 1, an advanced boiling water reactor (ABWR) 10 is illustrated which incorporates a welded-in type core shroud. Prior to discussing the shroud configuration, however, it may be helpful to briefly describe the reactor construction in general.

The reactor pressure vessel (or RPV) 12 is a substantially cylindrical vessel with a single full diameter removable head 14 bolted to the vessel as shown at 16. The RPV 12 houses the core shroud 18, the top guide assembly 20, the core plate assembly 22, steam separators 24 and steam dryers 26. Also included in the reactor assembly are the reactor internal pumps 28 (also referred to herein as jet pumps), control rods 30 and associated drives 32. The control rods 30 occupy alternate spaces between fuel assemblies within the core in a conventional fashion, and may be withdrawn into the guide tubes below the core during plant operation.

Figure 2:
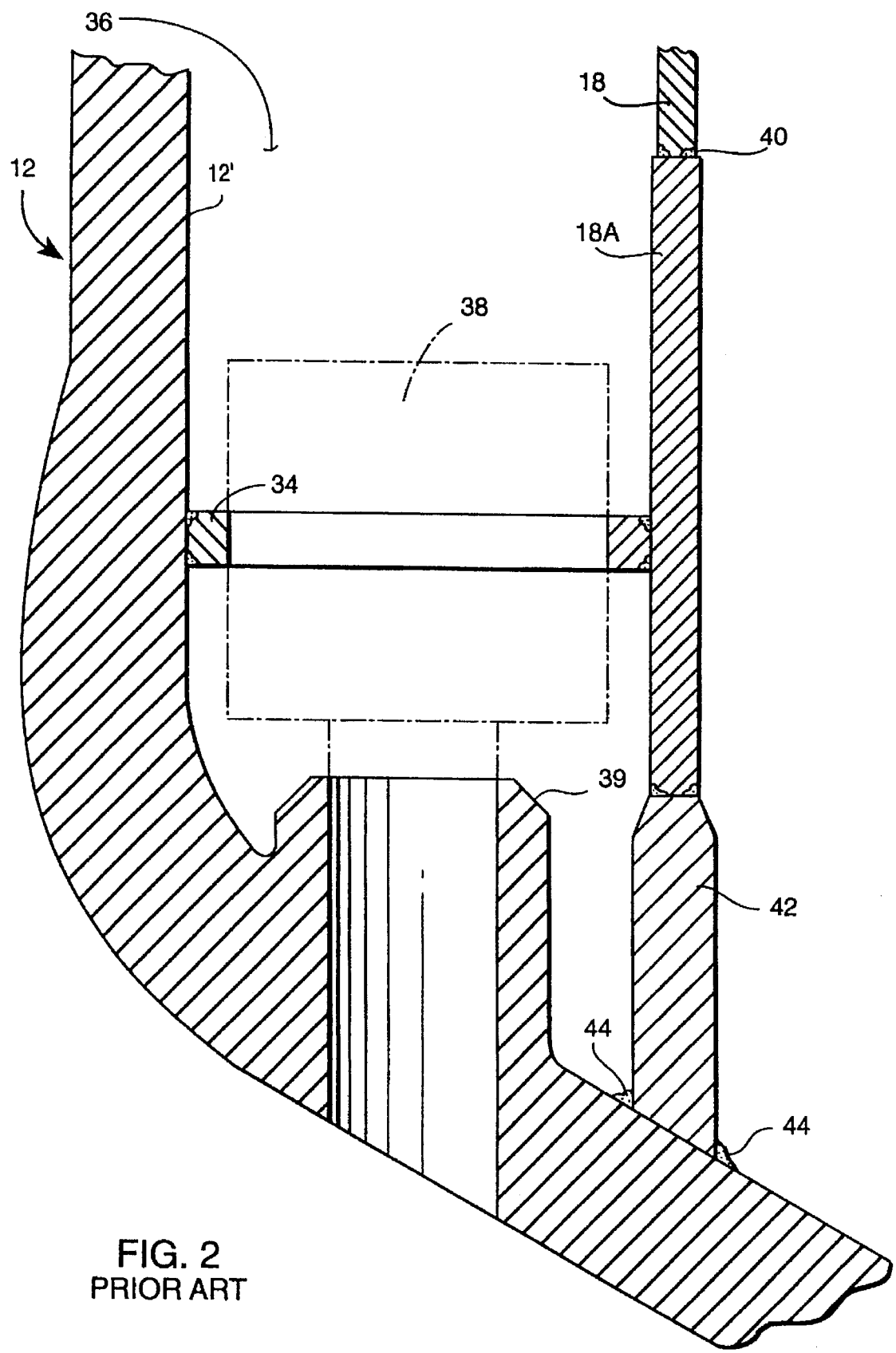
FIG. 2 is an enlarged detail taken from the lower left corner of the reactor shown in FIG. 1.

An annular pump deck 34 extends around the core shroud 18, in the annular space or annulus 36 between the shroud 18 and the inside of the RPV sidewall. Pumps 28 project through the bottom of the RPV and include diffusers 38 which extend upwardly through pump openings or inlets 39 in the deck 34 and into the annulus 36 as best seen in FIG. 2.

All major internal components of the conventional BWR type reactor can be removed except the jet pump diffusers 38, the core shroud 18, the jet pumps 28 and the high pressure coolant injection inlet piping. The invention here specifically has to do with the core shroud 18 and the pump deck 34, best seen in FIG. 2. As shown there, the jet pump discharge diffusers (one shown at 38) penetrates the pump deck 34 below the core elevation to introduce the coolant into the inlet plenum or annulus 36. The pump deck 34 itself is welded to the vessel wall at 12' as well as to the thickened base portion 18A of the shroud 18 at 40. The shroud base 38, in turn, is welded to an annular support leg 42 welded to the bottom of the vessel at 44. Thus, it will be appreciated that the shroud 18 and the pump deck 34 are intended to be permanent installations in the conventional BWR construction.

Figure 3:
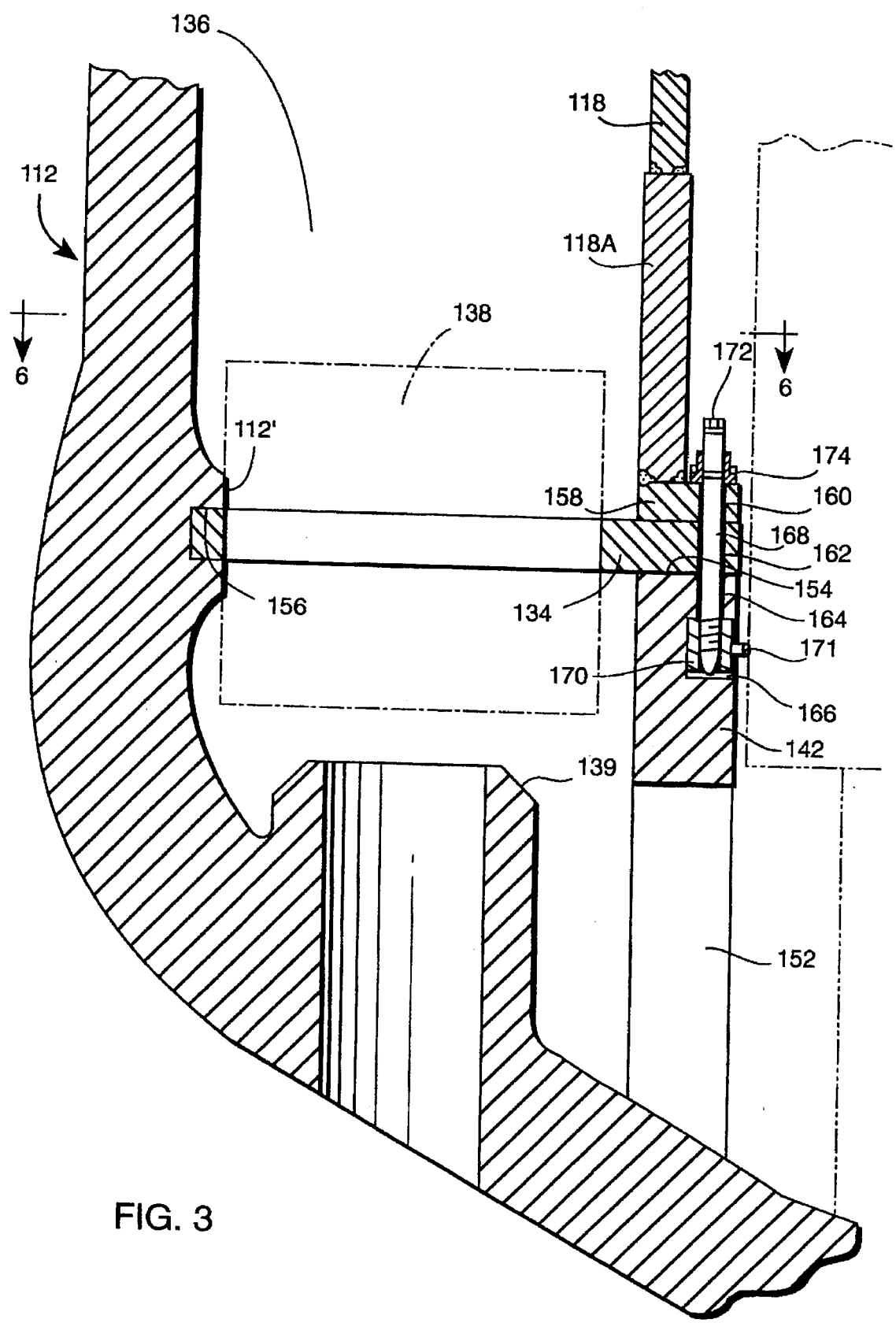
FIG. 3 is an enlarged detail similar to that shown in FIG. 2, and taken along the section line 3—3 of FIG. 5, and illustrating a removable shroud and pump deck in accordance with an exemplary embodiment of this invention.

With reference now to FIG. 3, a new removable core shroud 118 and pump deck 134 in accordance with this invention are illustrated. For convenience, similar reference numerals as used in FIGS. 1 and 2 are used in FIG. 3 where appropriate to identify corresponding elements, but with the prefix "1" added. In accordance with this invention, the annular shroud support leg 142 now extends upwardly above the pump inlet 139 and includes horizontal flow openings (one shown) 152. The support leg 142 has an upper edge or support surface 154 which is adapted to support the pump deck 134. At the same time, the outer periphery of the pump deck 134 is supported within an interior, radially inwardly facing annular groove 156 in the RPV wall at 112', the base of which is at the same height as surface 154 on support leg 142. This allows the pump deck 134 to be supported horizontally within the annulus 136 via insertion in the groove 156 and atop the support leg 142. It should be noted here that the annular pump deck 134 is provided in the form of ten part annular segments, the annular extent of each of which is made apparent from FIGS. 5 and 8, as discussed further hereinbelow.

Figure 6:
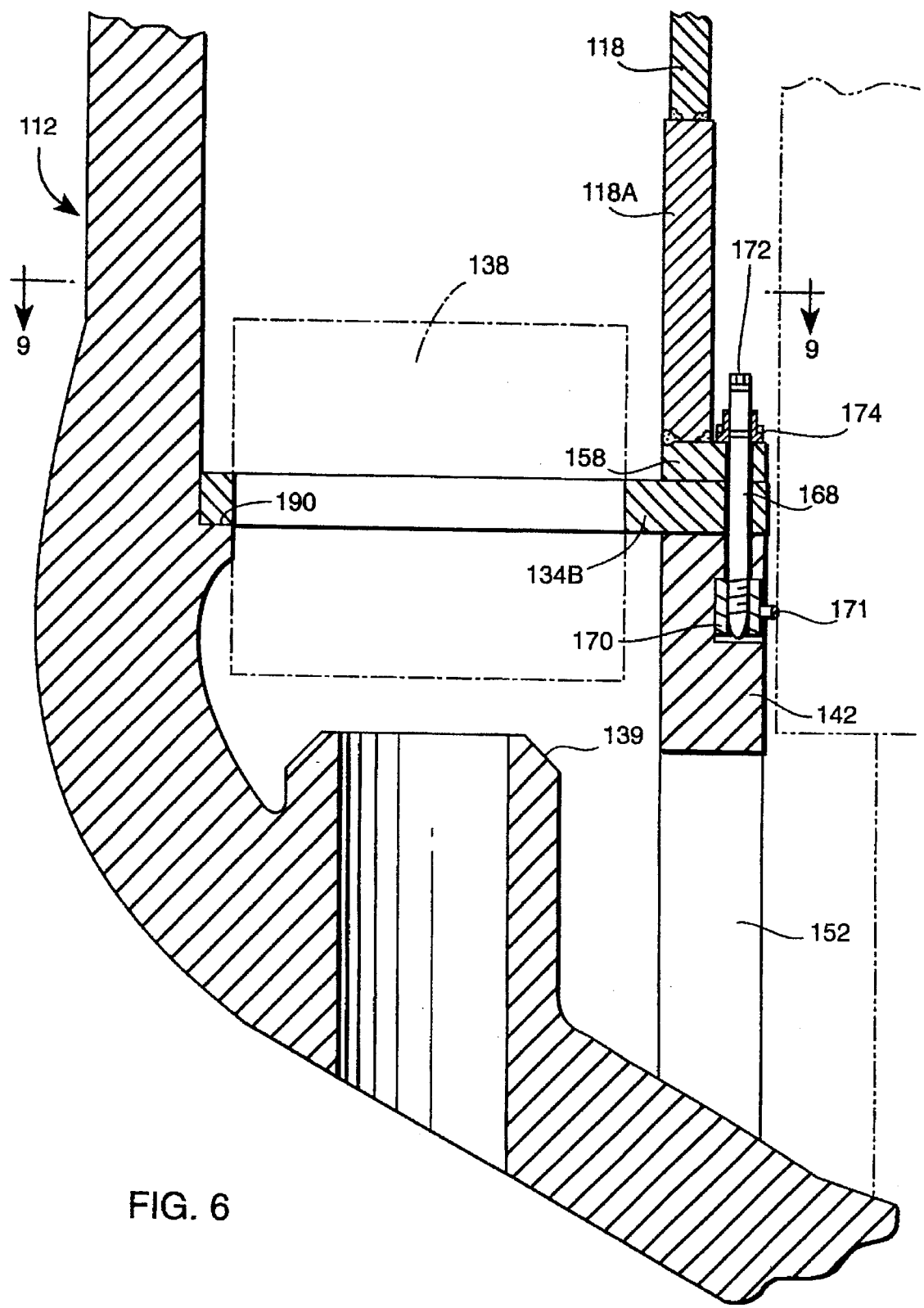
FIG. 6 is an enlarged sectional detail taken along the line 6—6 of FIG. 8, illustrating a keyed segment of the pump deck.

The shroud 118 and its thickened (but now axially shortened) base 118A are provided with a radially inwardly directed annular flange ring 158 which is welded to the bottom of the shroud base, and sized and located to seat fully on the surface 154. The flange ring 158 is formed with a through bore 160 which is aligned with a bore 162 in the pump deck and a bore 164 in the support leg 142 which opens into a radially inwardly facing, open recess 166. This arrangement allows a bolt 168 to pass through the bore 160 of flange 158, through the bore 162 in the pump deck 134, and into the recess 166 where it is threadably secured by a block nut 170 which is snugly received in the similarly shaped recess 166. It will be appreciated that a plurality of such bolt holes and bolts are circumferentially spaced about the flange ring, as best seen in FIG. 6. These bolts 168 restrain vertical loading on the shroud 118. Each block nut 170 is provided with a bail 171 which facilitates removal of the block nut 170 remotely (from above) with the aid of a specialized lifting tool (not shown), after the bolt has been disengaged from the nut. Bolts 168 are also provided with hex heads 172, and locking hex heads 174 which may be spot welded upon assembly. By this arrangement, it is not necessary to tap directly into the support leg 142, and no additional welds are required.

Figure 4:
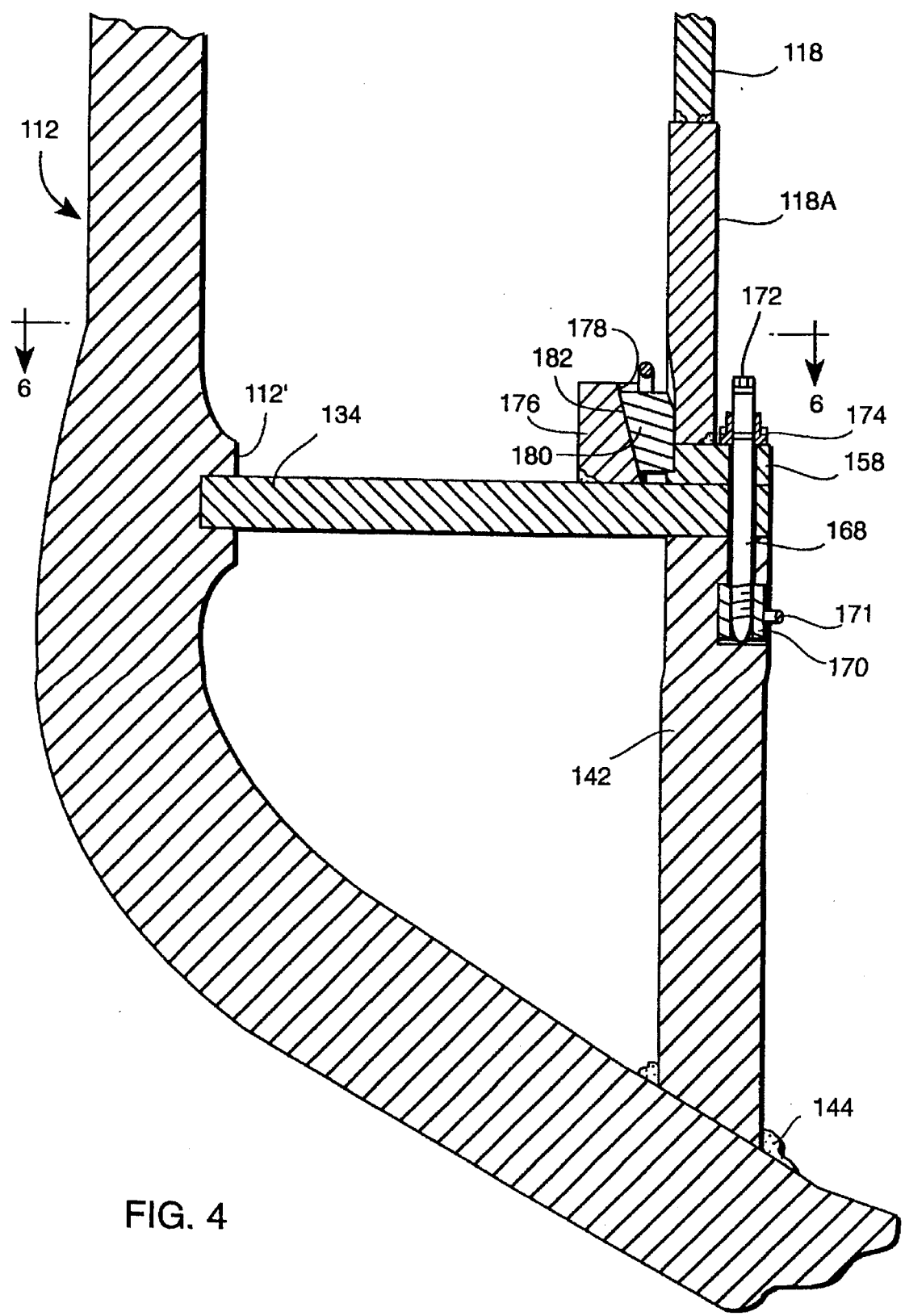
FIG. 4 is an enlarged section detail taken along the line 4—4 of FIG. 5.
Figure 5:
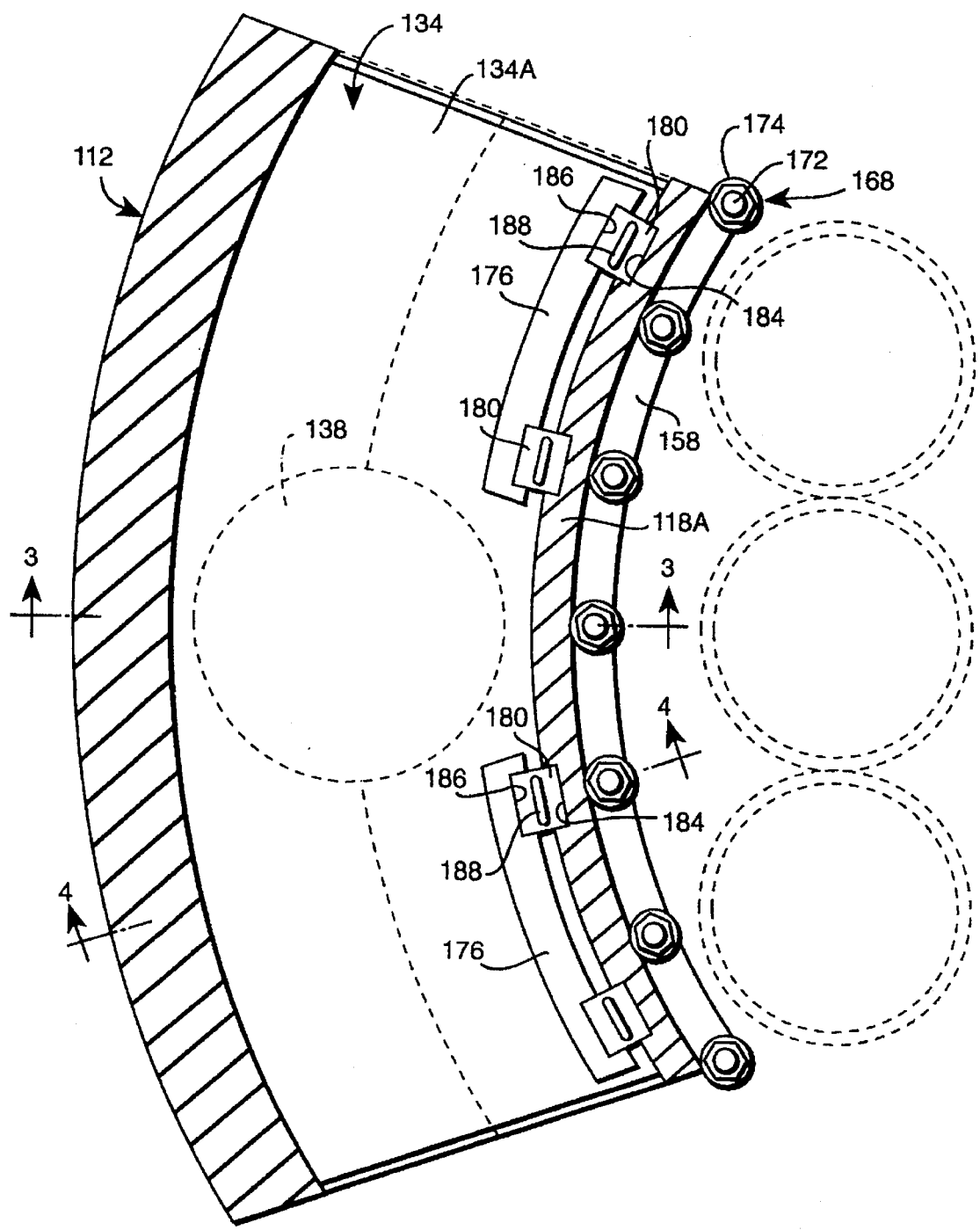
FIG. 5 is a partial section taken in plan of the removable shroud and removable pump deck segments in accordance with the invention.

With specific reference now to FIGS. 4 and 5, a plurality of wedge support blocks 176 are located on the segments of the pump deck 134 (for example, two wedge segment blocks per segment) at circumferentially spaced locations about the base portion 118A of the core shroud 118. These blocks 176 are radially outwardly spaced from the shroud base 118A and have radially inner tapered surfaces 178 (best seen in FIG. 4). This allows space for wedge elements 180 (two per support block) to be inserted between the shroud and the support blocks. The wedges 180 each have a mating tapered surface 182 for engagement with surface 178 of the respective block 176. The base 118A of the core shroud 118 as well as each block 176 are formed with aligned recessed grooves or keys 184, 186, respectively, for receiving the wedge elements 180, as further described below, and as best seen in FIG. 5. Each wedge element 180 is also provided with a lifting bail 188 to facilitate removal of the wedge element, again, by remote tooling. It will be understood that the wedging action between blocks 176 and wedge elements 180 serves to transfer horizontal loading on the shroud to the pump deck.

Figure 7:
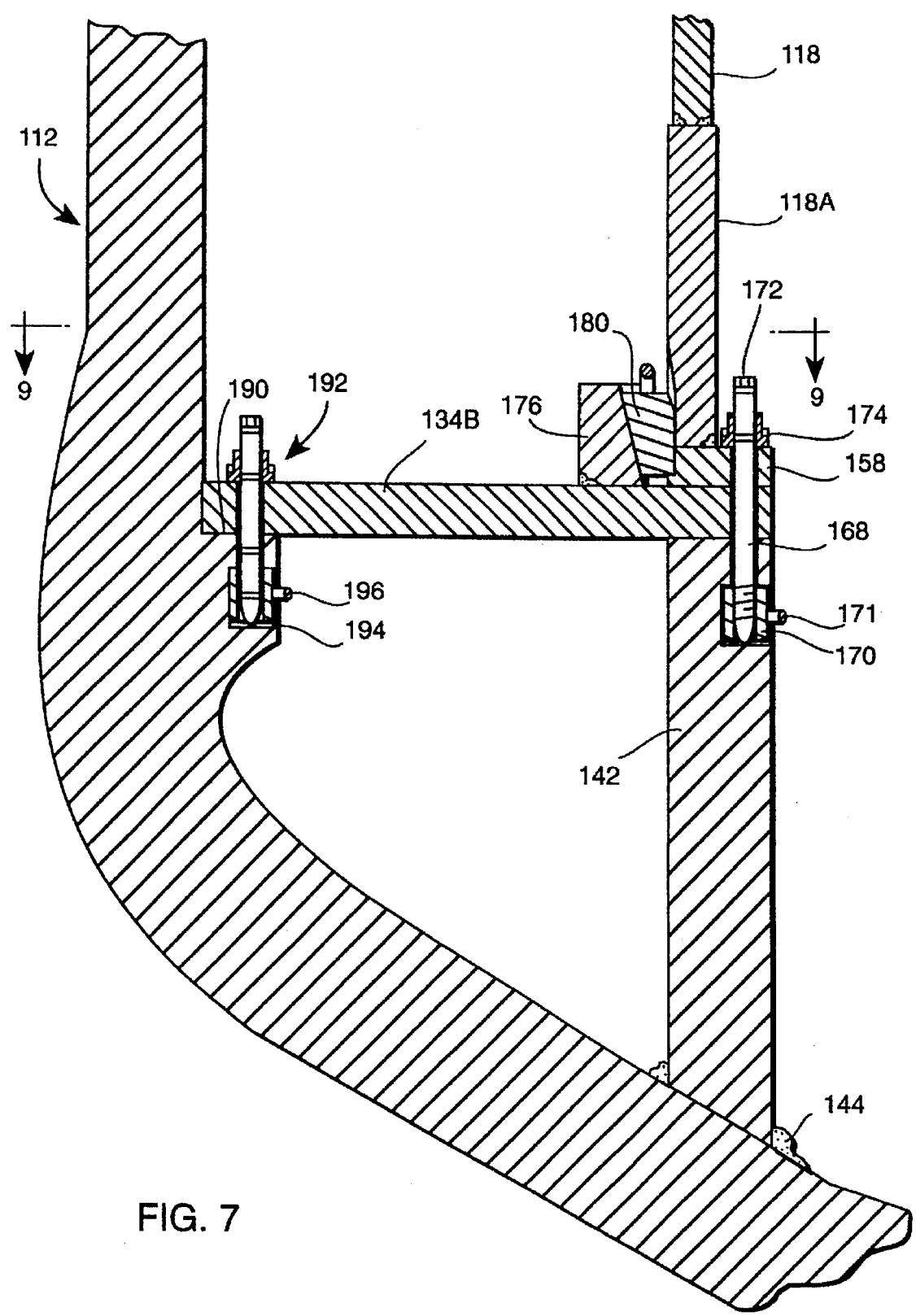
FIG. 7 is an enlarged sectional detail taken along the line 7—7 of FIG. 8, illustrating the wedge lock on the keyed segment of the pump.
Figure 8:
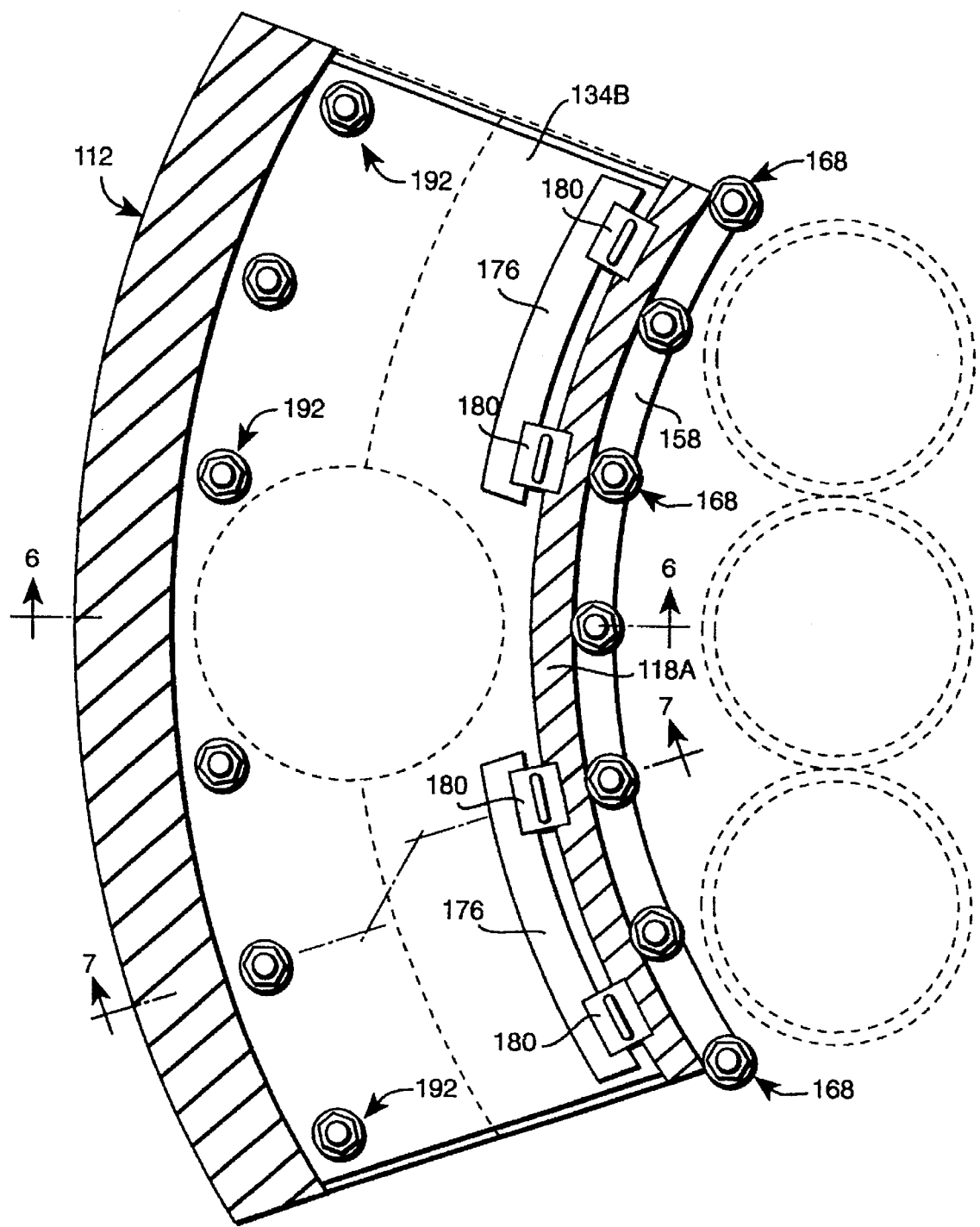
FIG. 8 is a partial section, also taken in plan, similar to FIG. 6 but illustrating the keyed pump deck segment in accordance with this invention.

As noted above, the annular pump deck 134 is divided into ten segments, nine of which are similar to that shown at 134A in FIG. 5. An otherwise conventional RIP diffuser 138 is located in the middle (circumferentially) of each segment. Turning now to FIGS. 6, 7 and 8, the tenth pump deck segment 134B serves as a keylock segment, which is the last segment installed and the first segment removed. This keyed segment 134B does not seat in a groove in the RPV wall, but rather, is seated on an arcuate support ledge 190 formed by the RPV wall by removing the upper part of the groove 156 in an arcuate portion substantially equal to the arcuate length of the segment 134B (FIG. 6). At annularly spaced locations along this keyed segment, the latter is bolted into the pressure vessel support ledge 190 as shown in FIGS. 7 and 8. A bolt and block nut/bail assembly 192, similar to the bolt 168, block nut 170 assembly, is utilized to secure the keyed segment to the RPV support ledge 190. Note also the recess 194 in the RPV wall which receives the block nut of the assembly 192. Once again the block nut of assembly 192 includes a bail element 196 to facilitate removal.

Figure 9:
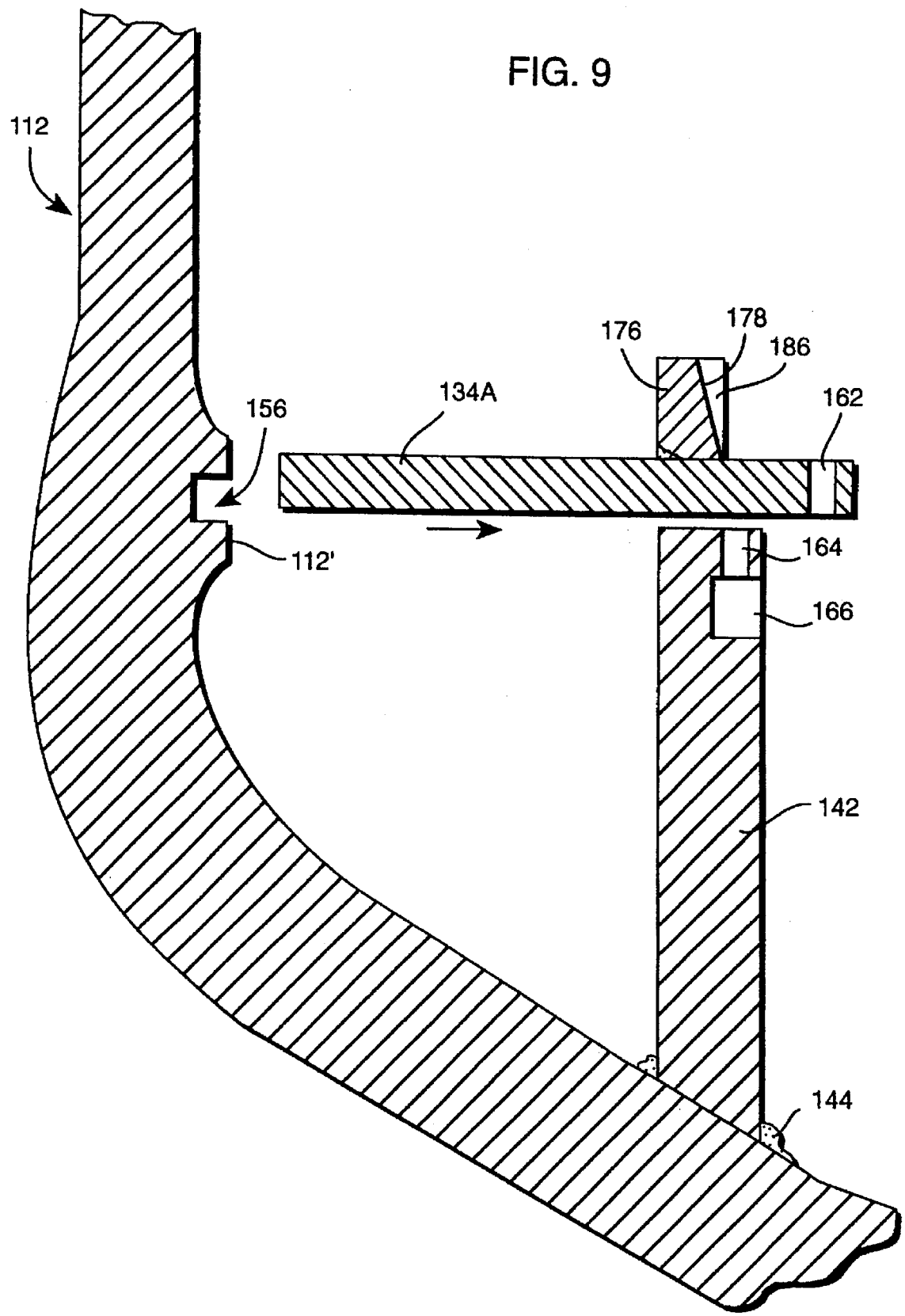
FIG. 9 is a partial sectional detail similar to FIG. 4 but illustrating the manner in which the shroud and pump deck are removed from the reactor pressure vessel.

With reference now to FIG. 9, it will be appreciated that removal of all bolts 168 and wedge elements 180 will enable the core shroud 118 to be lifted upwardly away from the core. The pump deck key segment 134B can then be unbolted and removed. The remaining pump deck segments 134A can then be pulled laterally out of the groove 156 in the RPV wall portion 112' (after its corresponding RIP diffuser 138 has been removed).

It will be appreciated that, with the exception of the welds at the juncture of the shroud support leg 142 and the bottom of the RPV, virtually all horizontal welds are contained in removable elements, i.e., the shroud 118, shroud base 138 and pump deck 134, so that faulty welds can be relatively easily repaired and/or replaced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a pressure vessel of a nuclear reactor containing a core assembly enclosed within a core shroud, the core shroud spaced radially inwardly of a side wall of the pressure vessel with an annular pump deck located in an annular radial space between the core shroud and the side wall of the pressure vessel, the improvement wherein the shroud is removably secured to an annular support leg extending upwardly from the bottom of the pressure vessel, wherein a radially inwardly directed flange ring is provided on the lower end of the shroud, said flange ring provided with a plurality of annularly spaced holes for receiving a corresponding number of fasteners used to secure the shroud to said annular support leg, and further wherein said pump deck is sandwiched between said flange ring and said annular support leg at its radially inner end and is supported within a radially inwardly facing groove in said side wall of the pressure vessel about most of its radially outer end.

2. In a pressure vessel of a nuclear reactor containing a core assembly enclosed within a core shroud, the core shroud spaced radially inwardly of a side wall of the pressure vessel with an annular pump deck located in an annular radial space between the core shroud and the side wall of the pressure vessel, the improvement wherein the shroud is removably secured to an annular support leg extending upwardly from the bottom of the pressure vessel, and further wherein a plurality of wedge supports are fixed to said pump deck, with at least a corresponding plurality of wedge elements functionally engaged between said wedge supports and said core shroud.

3. The improvement of claim 2 wherein two wedge elements are provided for each wedge support.

* * * * *